United States Patent [19]
Hon

[11] Patent Number: 5,623,661
[45] Date of Patent: Apr. 22, 1997

[54] SYSTEM FOR AND METHOD OF PROVIDING DELTA-VERSIONING OF THE CONTENTS OF PCTE FILE OBJECTS

[75] Inventor: Lenny K. -M. Hon, North York, Canada

[73] Assignee: International Business Machines Corp., Armonk, N.Y.

[21] Appl. No.: 564,771

[22] Filed: Nov. 29, 1995

[51] Int. Cl.$^6$ ............................... G06F 1/00; G06F 17/30
[52] U.S. Cl. ......................... 395/601; 395/701; 395/670; 395/200; 395/200.01
[58] Field of Search ................................... 395/700, 600, 395/650; 364/300, 200

[56] References Cited

U.S. PATENT DOCUMENTS

| | | | |
|---|---|---|---|
| 4,558,413 | 12/1985 | Schmidt et al. | 364/300 |
| 4,714,992 | 12/1987 | Gladney et al. | 364/200 |
| 4,809,170 | 2/1989 | Leblang et al. | 364/200 |
| 4,912,637 | 3/1990 | Sheedy et al. | 364/300 |
| 5,303,375 | 4/1994 | Collins et al. | 395/650 |
| 5,317,728 | 5/1994 | Tevis et al. | 395/600 |
| 5,485,615 | 1/1996 | Wennmyr | 395/700 |
| 5,557,793 | 9/1996 | Koerber | 395/600 |

OTHER PUBLICATIONS

Klahold et al. "A General Model for Version Management in Databases", Very Large Database Endowment, Proceedings of the Twelfth International Conference on Very Large Data Bases, pp. 319–327. Aug. 1986.

Leblang et al. "Computer–Aided Software Engineering in a Distributed Workstation Environment", ACM, pp. 104–112 1984.

Goldstein et al. "A Layered Approach to Software Design", Xerox Corp. Dec. 1980.

Svobodova, Liba, "A Reliable Object–Oriented Data Repository for a Distributed Computer System", ACM, Proceedings of the Eighth Symposium on Operating Systems Principles, vol. 15, n. 5, pp. 47–58. Dec. 1981.

Colket, William Currie, "Ada Tool to Framework Interface for Avionics Integrated Project Support Environments", Digital Avionics Systems, 1990 Conference, pp. 589–594 1990.

Loftus et al. "Arise: Operating PCTE Over a Wide–Area Network", IEEE Proceedings Software Engineering Environments, vol. 10, n. 6, pp. 60–62 Jul. 1993.

Sagols, Germain "Overview on PCTE Standardization", IEEE Assessment of Quality Software Development Tools. 1992 Symposium, pp. 83–89. Aug. 1992.

Anderson et al. "An Evaluation of PCTE as a Portable Tool Platform", IEEE Software Engineering Environments, pp. 96–100 Sep. 1993.

Henrich, Andreas "P–OQL:an OQL–oriented Query Language for PCTE", IEEE Software Engineering Enviornments, 1995, pp. 48–60 Feb. 1995.

Atsushi et al. "Generating Data Access Programs from PCTE Schemas with Constraints", IEEE Asia–Pacific Software Engineering, 1994 Conference (1st), pp. 298–307 Aug. 1994.

*Primary Examiner*—Wayne Amsbury
*Assistant Examiner*—Charles Rones
*Attorney, Agent, or Firm*—Edward H. Duffield

[57] ABSTRACT

A method and system for providing delta-versioning of data stored in an object-based data repository. In the preferred embodiment, delta-versioning is provided for "file" objects in a PCTE implementation in a manner which is relatively versatile for developers of PCTE compliant tools and programs and which is largely transparent to the users of those tools and programs. Further, redundant restoration of delta-versioned data is minimized and automatic removal restored data which is no longer needed is provided.

23 Claims, 6 Drawing Sheets

SYSTEM FOR AND METHOD OF PROVIDING DELTA-VERSIONING OF THE CONTENTS OF PCTE FILE OBJECTS

BACKGROUND OF THE INVENTION

1. Field of the Invention

The present invention relates to a method and a system for providing delta-versioning of data associated with objects. More specifically, the method and system of the present invention provides delta-versioning of data associated with objects stored in a repository in software engineering environments, such as PCTE, wherein data associated with the objects can be stored in files on a host file system. The present invention also allows for delta-versioning of data associated with objects which are arranged in version graphs including multiple predecessor and successor objects.

2. Description of the Prior Art

It is known in software development systems and other file creation systems to provide control of the various versions of documents which are produced. One known document management tool is SCCS (Source Code Control System) which is described in "The Source Code Control System", M. J. Rochkind, National Conference on Software Engineering, 1st proceeding, Washington, D.C., Sep. 11, 1975, pp. 37–43 and in other references. In SCCS, all versions of a source code file are maintained to provide a history of the amendments which have been effected between the original version of a source code file and its most recent version or versions.

One of the disadvantages of maintaining multiple versions of files is the amount of data storage required to store them. In large software development projects, hundreds of versions of various source code files may be created, necessitating large data storage repositories. To reduce the size of the storage repositories which would otherwise be required for storing multiple versions of documents, it is known to employ either forward or reverse delta-versioning.

In forward delta-versioning, a delta control file is created representing the complete first version of a file and "deltas" are added to the control file for each subsequent version. These deltas represent the changes required to convert a previous version of a file to a later version. Once a delta for a subsequent version file has been added to the delta control file, the version file may be removed from the file system as it can be restored, when needed, from the delta control file. As a delta is almost always much smaller than the version file, a significant saving of storage space results.

For example, a delta control file may be created for version 1 of a file and the version 1 file is then deleted. When a new version of the file, version 2, is created the delta control file is updated to include the version 2 delta which contains the changes which were effected to version 1 of the file to obtain version 2. If the user wishes to access version 1, the original version of the file is extracted from the delta control file. If the user wishes to access version 2, the original version is extracted and the changes in the version 2 delta are applied to it to restore version 2 of the file. If, as is often the case, multiple versions have been created and "delta-ed", then the original version is extracted and the changes of each intervening delta are applied, in sequence, to restore the desired version of the file.

Reverse delta-versioning is similar to forward delta-versioning, differing only in that the most recent version of the file is stored in full in the delta control file along with deltas to recreate preceding versions.

Delta-versioning is often implemented as part of a version management tool, such as the above-mentioned SCCS, however this is a problem in that such version management tools are often standalone systems. For example, SCCS is a separate tool from other development tools, such as data modelling, text editing or formatting tools. A user must therefore first invoke the versioning tool to obtain the version of the file desired and then must invoke a separate tool to operate on the recovered version of the file.

In general, the lack of integration between various development tools has been a problem with Computer Aided Software Engineering (CASE) systems. Relatively recently, development tool manufacturers have attempted to define Software Engineering Environments (SEEs) to facilitate the sharing of data between different development tools. One such effort has been made by the European Computer Manufacturers Association (ECMA), which association has defined the Portable Common Tool Environment (PCTE) in the publication, "Portable Common Tool Environment—Abstract Specification", standard ECMA-149, December 1990 and in "Portable Common Tool Environment—C Programming Language Binding", standard ECMA-158, June 1991, the contents of each of which are included herewith by reference.

PCTE is a SEE which comprises a public tool interface, or application program interface (API), and a repository wherein all of the information required in the SEE may be stored. Currently, API's (or bindings) are defined for the C and Ada programming languages, although other API's may well be available in the future.

The information stored in the repository includes software tool programs, data and documents and the public tool interface allows that information to be shared and used by various tools and/or users. In PCTE the repository is object-based, as is described below in more detail.

While PCTE provides for improved sharing of data between tools, problems exist with PCTE and similar systems that employ an object-based repository in that no provisions have been made for delta-versioning of data associated with objects stored in the repository.

SUMMARY OF THE INVENTION

It is an object of the present invention to provide a novel method of providing delta-versioning of data associated with objects in a repository. It is a further object of the present invention to provide a novel system to provide delta-versioning of data associated with objects in a repository.

According to one aspect of the present invention, there is provided a method of providing delta-versioning for data associated with one or more specified objects stored in a data repository, the data being stored on a host file system, comprising the steps of:

(i) defining a delta-versioning program to be used with the data associated with each of said one or more specified objects;

(ii) creating a delta control file and associating the delta control file with each of said one or more specified objects, the data associated with each of said one or more specified objects being incorporated into said delta control file and otherwise removed from the host file system;

(iii) associating a unique identifier with each of said one or more specified objects, said identifier indicating the contents of said delta control file required to reconstruct the data associated with the specified object associated with said identifier.

Preferably, the defined delta-versioning program is executed to restore data associated with a selected object by the unique identifier from the delta control file to a file on the host file system. Also preferably, the method first checks to determine if the data associated with a selected object has already been restored to a file on the host file system and only restores the data if it is not already present. Also preferably, the method removes the file of restored data from the host file system when it is no longer in use. Also preferably, any object in a version graph of objects may be specified for delta-versioning of the data associated with it and that object and all objects preceding it in the version graph will have the data associated with them delta-versioned. Also preferably, the method can be arranged to delta-version the data associated with all of the objects in the version graph.

According to another aspect of the present invention, there is provided a system for providing delta-versioning of data stored on a host file system, said data being associated with objects stored in a data repository, said stored objects including an original object and one or more related objects which are succeeding versions of said original object, comprising: means to create a delta version control file containing an original version delta for data associated with said original object; means to create a subsequent delta in said delta control file between data associated with a selected one of said one or more related objects and data associated with one of said original object and the others of said one or more related objects which precede said selected one object; means to remove said data associated with said objects whose delta is in said delta control file from said host file system; and means to restore said data associated with a specified object to said host file system from said delta control file.

According to another aspect of the present invention, there is provided a method of providing delta-versioning for the contents of file objects in a PCTE data repository wherein the contents of each file object are stored as files on a host file system, comprising the steps of:

(i) defining a delta-versioning program to be used with the contents of one or more specified file objects;

(ii) creating a delta control file and associating the delta control file with each of said one or more specified file objects, the contents files of each of said one or more specified file objects being incorporated into said delta control file and the contents files being removed from the host file system;

(iii) associating a unique identifier with each of said one or more specified file objects, said identifier indicating the contents of said delta control file required to reconstruct the contents of the file object associated with each file object.

BRIEF DESCRIPTION OF THE DRAWINGS

Embodiments of the present invention will be described, by way of example only, with reference to the accompanying drawings, in which.

DETAILED DESCRIPTION OF THE PREFERRED EMBODIMENTS

For clarity, the following discussion only refers to forward delta-versioning systems but it will be clear to those of skill in the art that, with simple and apparent changes, the present invention can employ either forward or reverse delta-versioning systems, or both.

As briefly mentioned above, PCTE includes a repository to store all data, programs and documents in the system and to allow sharing of the stored information. In PCTE, data is stored in the repository as objects and each object has various attributes and links defined for it. In PCTE, the repository is referred to as the "object base" and may, for example, be distributed in multiple hosts connected in a network.

Figure 1:
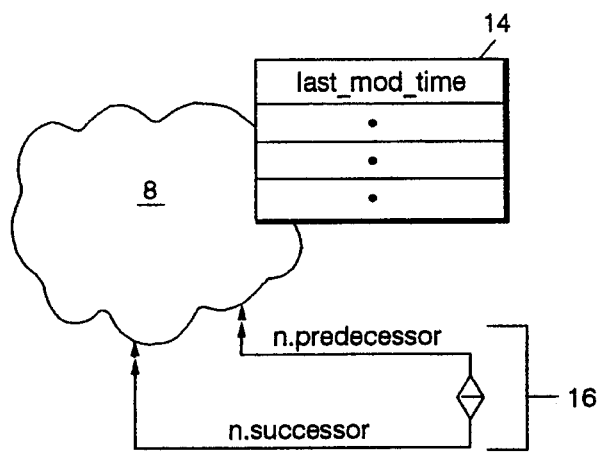
FIG. 1 shows a representation of the PCTE root object type "object" including some of its associated attributes and links.

In PCTE, the root (parent) object type for all objects in the object base is called "object". As shown in FIG. 1, the "object" type 8 includes a number of predefined attributes 14, including for example a "last_mod_time" attribute, and can include a number of links 16, including a "predecessor" link and a "successor" link. Typically, in PCTE links of cardinality many are labelled with a prefix which is related to the originating object to provide unique labels for the links (i.e.—0.successor).

Figure 2:
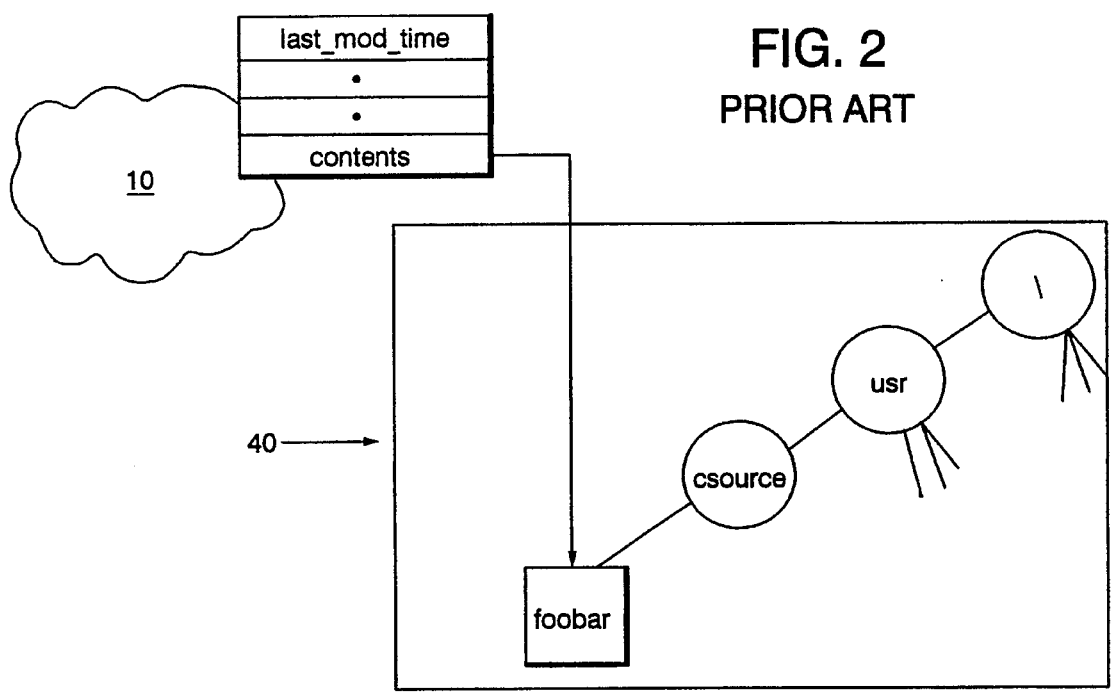
FIG. 2 shows a representation of a PCTE "file" object, including the mapping of its contents to a file on a host file system in a conventional PCTE system.

One of the features of PCTE is that it provides version management of objects. Accordingly, the "predecessor" link points to a preceding version of an object and the "successor" link points to the subsequent version of an object. In FIG. 2, the predecessor and successor links of object 10 do not exist indicating that it has no predecessor or successor objects.

As part of the version management provided by PCTE, the "predecessor" link has a stability property defined which prevents a preceding object from being modified. Instead, PCTE provides the "version_revise" API (application program interface) to create a new, revised, version of an object. This API creates a new version of the object and sets the "predecessor" link of the new object to point to the previous version of the object and sets the "successor" link of that previous object to point to the new object.

In PCTE, a "file" object is a sub-type of the "object" type and is primarily concerned with the contents of an object. As shown in FIG. 2, a "file" object 10 has a "contents" attribute. PCTE provides APIs for reading and writing the contents of a "file" object as a series of bytes which are not interpreted by the PCTE system. One of the uses for "file" objects is that, if data is stored in PCTE as "file" objects, conventional file-based development tools may be partially integrated into PCTE by encapsulating the development tools to employ PCTE "file" objects and their contents. However, as mentioned above, PCTE does not provide any means to implement delta-versioning of the contents of "file" objects stored in the PCTE repository.

In conventional implementations of PCTE, such as that developed at the IBM Application Development Technology Center in Toronto, Canada, the "contents" attribute of a PCTE "file" object "maps" to a file on a host file system 40. In FIG. 2, "file" object 10 has its contents stored in a file with the path and filename "\usr\csource\foobar" in the file system 40 and this path and filename form part of the "contents" attribute.

Figure 3:
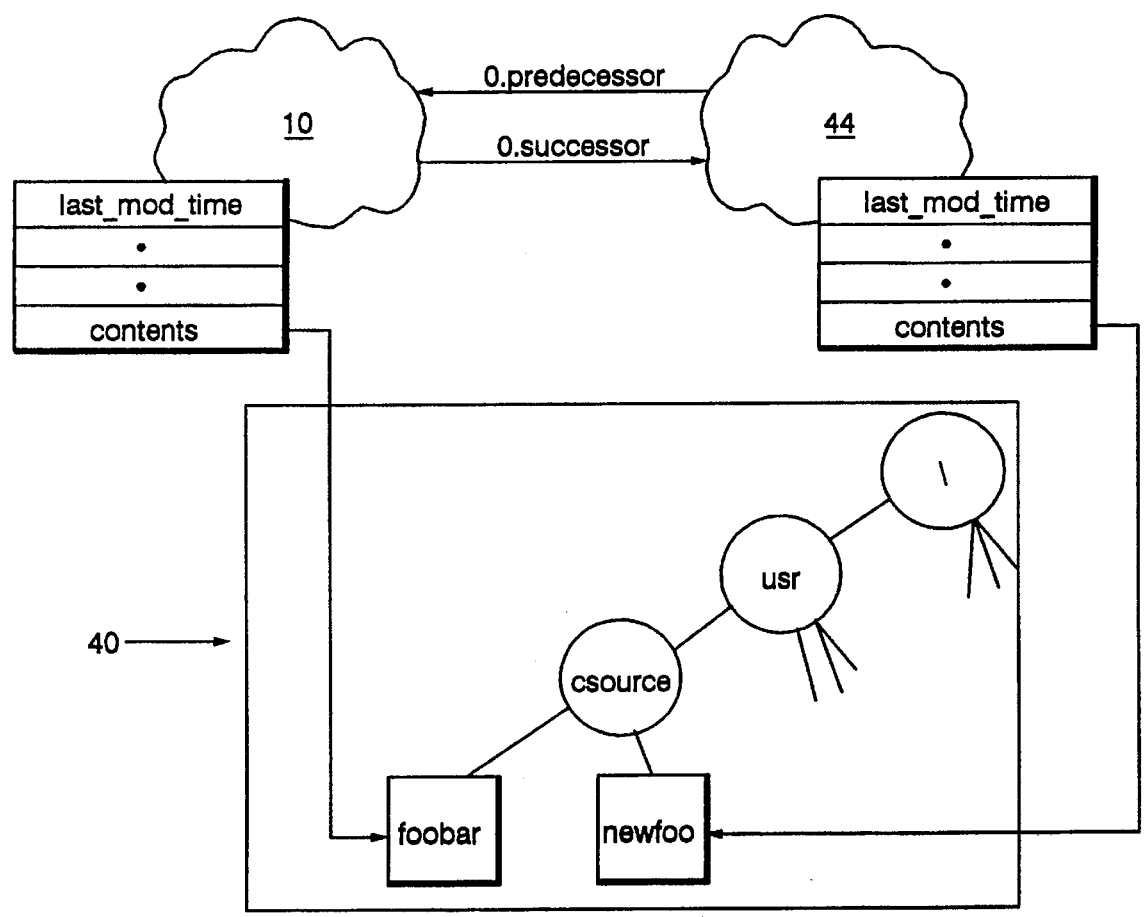
FIG. 3 shows a representation of the addition of a new version of the "file" object of FIG. 2, including the mapping of its contents.

FIG. 3 shows the result of a user creating a new version 44 of object 10 using the above-mentioned "version_revise" API. As shown in the Figure, the "successor" link of object 10, labelled "0.successor", is set to point to new object 44 and the "predecessor" link of object 44, labelled "0.predecessor", is set to point to object 10. Also, the contents of object 44 are stored in the file "newfoo" at "\user\csource" and the "contents" attribute is set accordingly.

The present invention provides a method and system whereby an implementer of a PCTE compliant tool or program may provide delta-versioning of the contents of "file" objects in a simple, consistent manner which is largely transparent to a user. This is accomplished, within an otherwise conventional PCTE implementation, primarily by providing two external interfaces, namely: a delta-versioning API; and a program specification. As described below, the delta-versioning API is called by a PCTE version control tool to perform delta-versioning on the contents of a "file" object and its predecessor objects. If specified by the tool calling the API, the successor objects can also be delta-versioned by passing the API a boolean parameter.

As is described in Appendix 1, the program specification defines the command line interface that the actual delta-versioning program(s) must comply with to be invoked from within the delta-versioning API.

In the "C" language, the delta-versioning API interface is:

```
int IBM_pcte_contents_create_delta (
        Pcte_object_reference     file_object,
        Pcte_boolean              delta_successor,
        Pcte_string               delta_program
);
```

In this interface, file_object is an object identifier to indicates the object to be delta-versioned, delta_successor is a boolean flag to indicate whether the successor object(s) to the specified object should also be delta-versioned (described below) and delta_program is a string which is the name of a program that has been written to comply with the program specification in Appendix 1 and is to be used to perform the actual delta-versioning work.

In the presently preferred embodiment of the present invention, the "file" object includes two additional, private, attributes. Specifically, there is provided: a "delta_prgm" attribute which indicates which delta-versioning program is used to delta or to recreate the contents, if this attribute does not exist, the "file" object has not been delta-versioned; and a "delta_version" attribute which indicates which particular delta within the delta control file represents the contents of the "file" object. Further, in the presently preferred embodiment if the contents of the "file" are delta-versioned, the "contents" attribute includes the path and filename of the delta control file for the contents.

In the present invention, the "file" object's private attributes are modified such that, when a program attempts to read or write the contents of a "file" object, the object first checks for the existence of the "delta_prgm" attribute to determine whether delta-versioning has been designated for the object.

For a read operation, if the "delta_prgm" attribute does not exist, the contents of the "file" object are accessed in the conventional fashion, i.e.—the file which stores the contents is read from the host file system 40. If the "delta_prgm" attribute exists, the delta-versioning program indicated by the "delta_prgm" attribute is called (transparently to the user) to restore the version of the contents required by the user from the delta control file. Specifically, the PCTE system employs the delta-versioning program indicated by the "delta_prgm" attribute and passes the delta-versioning program appropriate parameters (as described in Appendix 1) including parameters to indicate that a restore operation is to be performed, the version which must be restored (as indicated by the "delta_version" attribute), the path and filename of the appropriate delta control file (from the "contents" attribute) and a filename for the restored file created by the delta-versioning program.

To create a first (original) version of a "file" object, the user creates the "file" object and its contents in the normal manner. If the contents of the "file" object are to be delta-versioned, a call is made to the delta-versioning API to create a delta control file. Specifically, the API is called with suitable parameters including: the "file" object of interest; the delta-versioning program to be employed. The API sets the "file" object's "delta_prgm" attribute to the delta-versioning program to be used and invokes the delta-versioning program to create the delta control file for the "file" object's contents. The "contents" attribute in the "file" object is updated to include the path and filename of the delta control file which has been created and the "file" object's "delta_version" attribute is set to a value representing the version identifier which is returned by the delta-versioning program. Finally, the original, non-delta versioned, contents file on host file system 40 is deleted.

Figure 4:
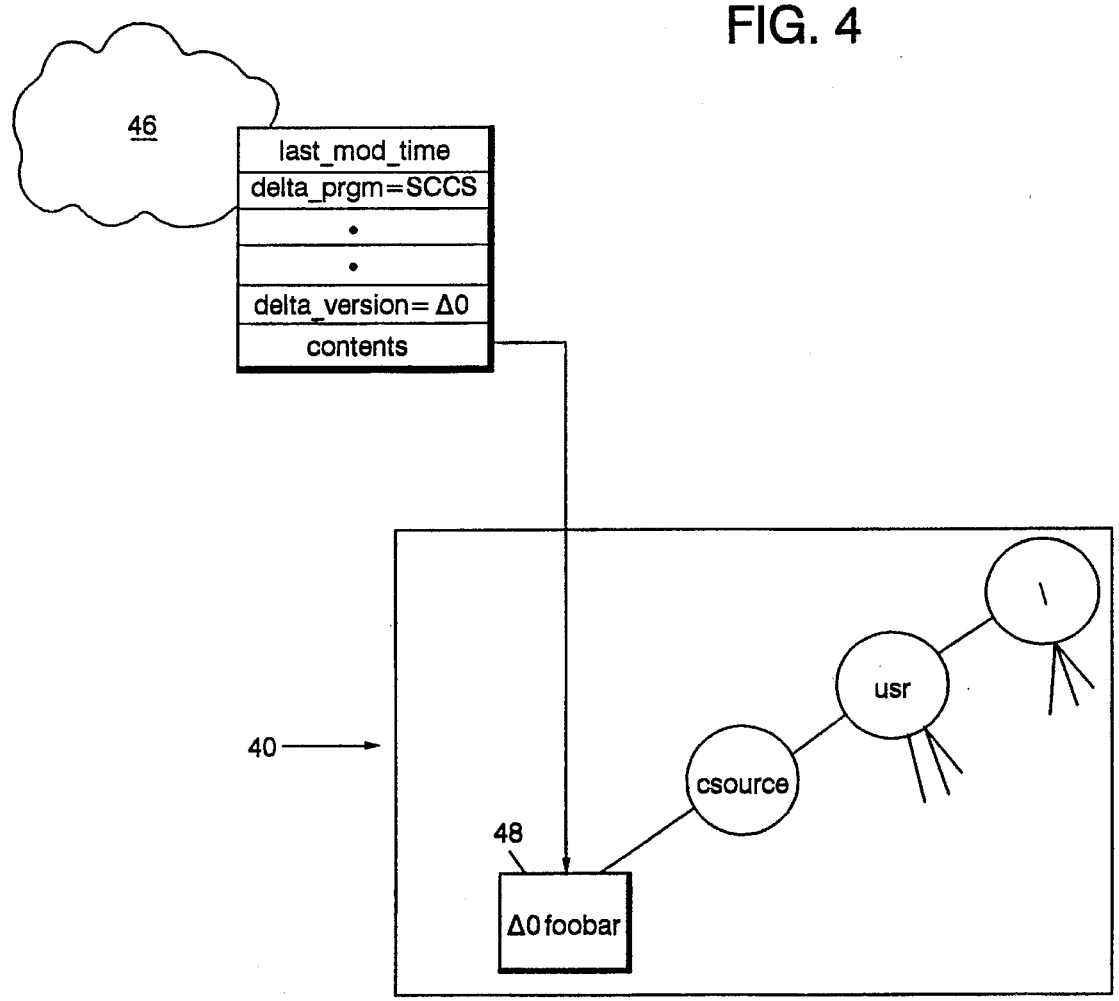
FIG. 4 shows a representation similar to that of FIG. 2 wherein the contents of the "file" object have been delta-versioned in a PCTE system in accordance with the present invention.

FIG. 4 shows a "file" object 46 which is similar to object 10 in FIG. 2 but whose contents have been delta-versioned. As shown in the Figure, a delta control file 48 has been created for the contents of object 46 on file system 40. The "contents" attribute has been updated to include the name and path to delta control file 48, the "delta_prgm" attribute has been set to indicate that the delta was created by the SCCS delta versioning program and the "delta_version" attribute has been set to the version identifier returned by the delta-versioning program, in this example indicating that the version is Δ0, i.e.—the original version.

Figure 5:
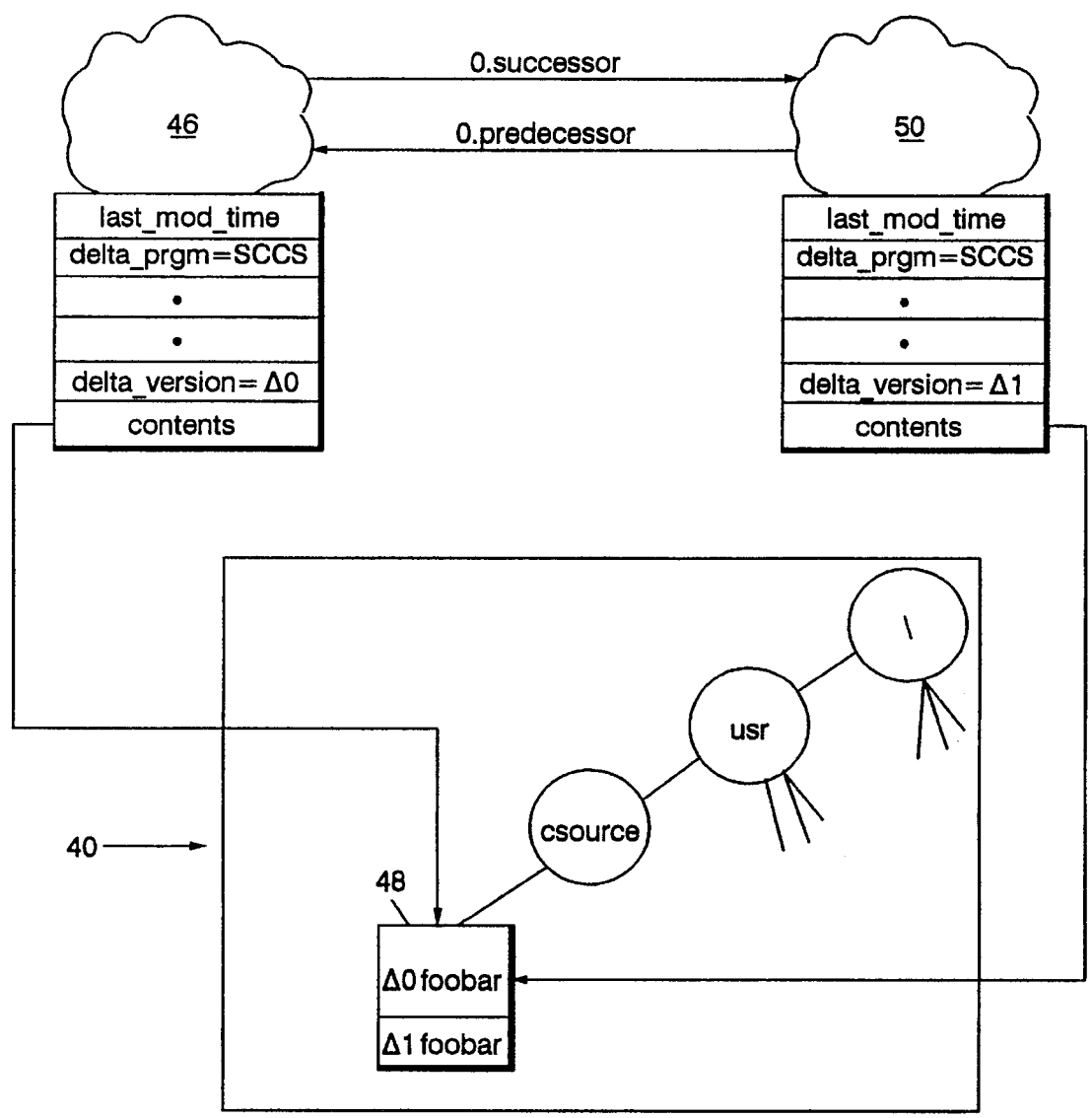
FIG. 5 shows a representation of the addition of a new version of the "file" object of FIG. 4.
Figure 6:
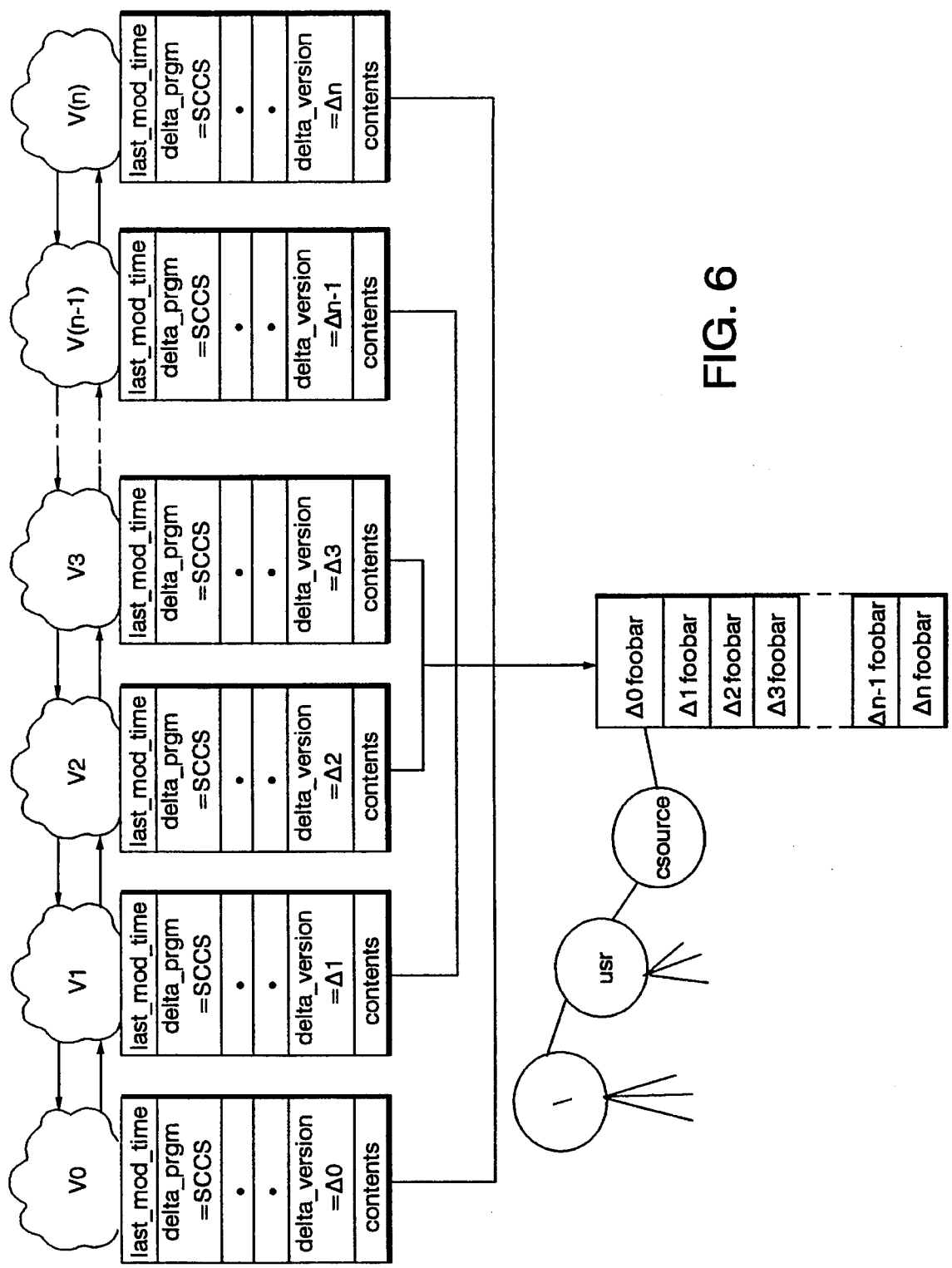
FIG. 6 shows a representation in accordance with the present invention of a plurality of versions of the "file" object of FIG. 4.

FIG. 5 shows the result of a new version of "file" object 46 of FIG. 4 being created with the "version_revise" API. The contents of the resulting "file" object 50 has also been delta-versioned by a call to the delta-versioning API with parameters including object 50 and the same delta-versioning program employed for delta-versioning the contents of object 46. The "contents" attribute of object 50 includes the path and filename of delta control file 48 which has been updated to include a delta to reconstruct the contents of object 50. Object 50's "delta_prgm" attribute is set to SCCS and its "delta_version" attribute is set to Δ1, as returned by the delta-versioning program. The "successor" link of object 46, "0.successor", is set to indicate object 50 and the "predecessor" link of object 50, "0.predecessor", is set to indicate object 46 in the conventional manner. FIG. 6 shows the results of creating multiple versions of a "file" object which have been delta-versioned.

As mentioned above, the present invention allows a user to delta-version a "file" object and its predecessors and successors. Accordingly, the present invention must be able, given a "file" object as a parameter to the delta-versioning API, to identify each predecessor and successor object of the given object. This is slightly complicated by the fact that PCTE allows an object to have multiple predecessor and/or successor objects, resulting in version graphs such as that shown in FIG. 7.

In the present invention, given an object as a parameter to the delta-versioning API, its version graph is determined during the execution of the API by first traversing the predecessor links of the object and, in turn, the predecessor links of its predecessors. If an object has multiple predecessors, the traversal fans out to encompass each branch of those predecessor links. The traversal of the objects in a branch ceases when the traversal reaches the earliest object of the branch or when the traversal reaches an object which has been previously identified during the traversal. In some circumstances, such as wherein a traversal starts from object V6 of FIG. 7, one or more objects such as object V3 will not be located by the predecessor traversal.

Once the traversal of the predecessor links has been completed, the successor links are traversed from the given object until the leaf objects of each branch are reached. At this point, and "missed" predecessor objects are identified by again traversing the predecessor links, as described above, starting from each identified leaf object. For the specific example of FIG. 7, object V3 would be identified by traversing the predecessor link from object V8.

Once a complete version graph has been obtained for the given object, the delta-versioning API invokes the delta-versioning program, which was passed to this API as a parameter, to "implement" the delta-versioning. The delta-versioning program is invoked to create a delta control file for the original object and to create and add deltas for each subsequent version object. The above-mentioned attributes of the delta-versioned objects are set appropriately and, as last step which occurs only after a successful creation of a delta control file and/or delta (described further below), the contents files are removed from the host file system.

Figure 8:
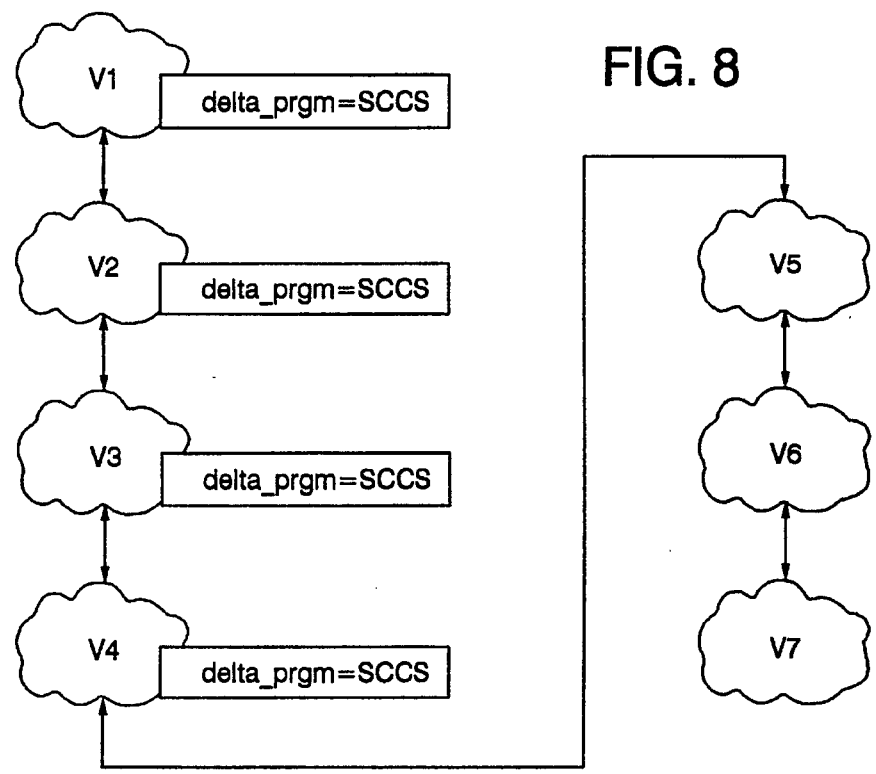
FIG. 8 shows a representation of a PCTE version graph which includes both objects that have been delta-versioned and objects which have not.

The present invention also allows delta-versioning of only part of a version graph by selecting an object for delta-versioning and not specifying that its successor objects should also be delta-versioned. In this case, a value of false is passed to the boolean parameter of the delta-versioning API indicating that only the predecessors of the given object are to be delta-versioned, thus excluding its successors. FIG. 8 shows an example wherein "file" objects V4 and its predecessor objects V3 through V1 have been delta-versioned without delta-versioning its successor objects V5 through V7.

If a user subsequently specifies that object V7 is to be delta-versioned, the present invention first cheeks to see if object V7 has a predecessor object. If it does not, unlike the example shown in FIG. 8, V7 is the original object and the delta-versioning program will be invoked to create a delta control file for the contents as previously described above. If object V7 does have a predecessor object, i.e. object V7 is a subsequent version of another "file" object as is the case in FIG. 8, the present invention will determine the version graph for V7, as described above. In the trivial case, none of the objects in the version graph have been delta-versioned and a delta control file is created for the original object in the version graph and deltas are added for each subsequent object, in turn, as described above. In the non-trivial case, such as that shown in FIG. 8 wherein some of the preceding objects have been delta-ed and some have not, the present invention identifies the earliest preceding object in the version graph which has been delta-versioned and delta-versions each succeeding object, in turn, by adding an appropriate delta to the delta control file indicated by the "contents" attribute of that earliest preceding delta-versioned object.

Figure 7:
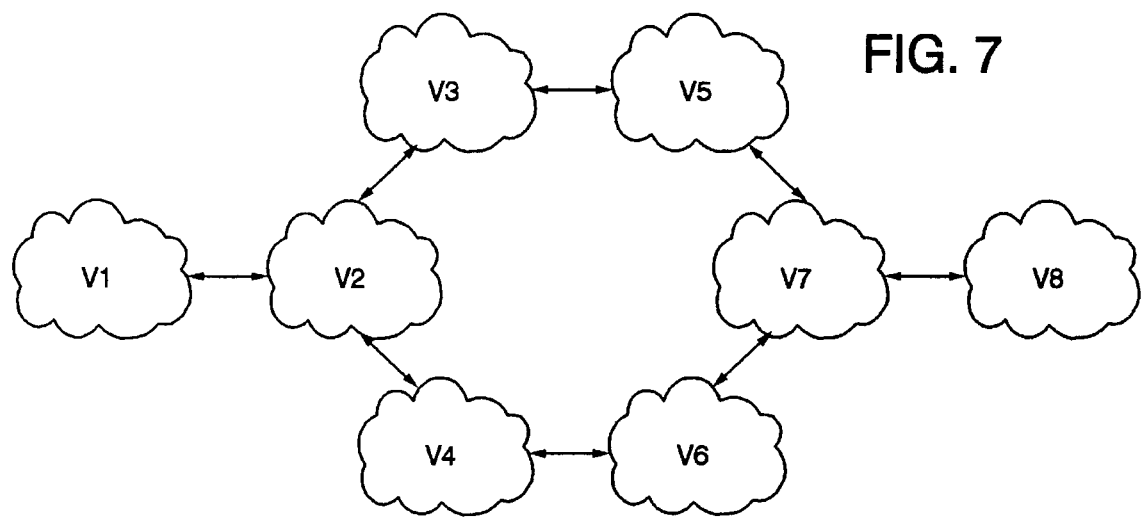
FIG. 7 shows a representation of a PCTE version graph for an object.

In the case, such as object of object V7 in FIG. 7, that an object has two or more predecessor objects, the delta is created between the object and the earlier of its predecessors. The attributes of each of the newly delta-versioned objects are appropriately updated and, upon completion of a successful delta-versioning, the contents files on the host file system are removed.

If desired, the user can specify that the present invention also cheeks to see if object V7 has any successor objects which should be delta-versioned. If delta-versioning is specified for successor objects, the present invention will check to see if object V7 has successor objects. If it does, they are delta-versioned, in turn, to complete the delta-versioning of the entire version graph.

An additional feature of the present invention is that of shared storage for restored contents files and automatic clearing of file system storage space when the restored contents are no longer needed. When a read operation (invoked by a "contents_open" or similar API) is performed on a "file" object whose contents have been delta-versioned, a check is performed to see if any other user already has restored the desired contents. Specifically, a check is performed to see if the restored contents file is already present on host file system 40. If so, the user is provided with a file handle to that restored contents file. If no other user is accessing the desired contents (i.e.—the restored contents do not already exist on the host file system), the contents are restored by the delta-versioning program (as described above) to a file on the host file system and the user is supplied with the file handle of the restored file while the delta control file and associated delta remain unchanged.

When the contents are no longer needed by a user, they are de-accessed (by a "contents_close" or similar API). When there is no longer any user accessing the restored contents file, the file is closed in the conventional manner and the file handle freed. In this manner, redundant storage is reduced and storage space which is no longer needed is freed.

By definition in PCTE, any API must be atomic, meaning that an API call must either completely succeed or have no effect if it fails. To comply with this requirement, the delta-versioning program provides two calls which allow the delta-versioning API to perform the necessary error correction steps if an invocation of the API fails. Specifically, the delta-versioning program includes a call which deletes a delta control file, thus removing all delta versions, and a call which removes deltas from a delta control file when the deltas are subsequent to a specified version. These two calls, in addition to the create, update and restore calls, allow for the required atomic implementation of the delta-versioning API.

Presently, many delta-versioning programs do not directly support the delta-versioning program specification of the present invention. Accordingly, the program specification has been designed to work with existing delta-versioning programs which have been encapsulated to correspond with the specification. Specifically, in the presently preferred embodiment the SCCS program has been encapsulated by a wrapper' implemented as a UNIX® KORN Shell script, as shown in Appendix 2. Of course, any suitable wrapper or encapsulation method may be employed to allow other delta-versioning programs to be employed, as would occur to those of skill in the art.

As mentioned above, the present invention is not limited to any particular delta-versioning system or program. It is contemplated that under some circumstances the implementer of a PCTE tool or program may wish to provide different delta-versioning programs for different types of contents. For example, SCCS may be provided for text contents while another delta-versioning program is provided for binary contents. In such a case, the tool implementer may first check the file contents to find out what program (SCCS for example) is suitable. When a suitable delta-versioning program has been determined, the API is called to perform the delta-versioning with the identified program.

The present invention provides for the delta-versioning of data associated with objects, such as the PCTE "file" object, in a manner which is transparent to the user and yet flexible for the implementer of the tool or program. The present invention also provides for the automatic freeing of storage space occupied by restored versions of contents files which are no longer required.

APPENDIX 1

A delta_command string comprises the name of the particular delta-versioning program selected followed by one of:

| COMMAND IDENTIFIER | PARAMETER(S) | DESCRIPTION |
| --- | --- | --- |
| –c | initial_version_file | this call creates a delta control file from the original version of the file "initial_version_file". The call returns the path and filename of the delta control file created and the version identifier produced by the delta program. |
| –d | delta_control_file, version_file | this call creates a delta between the file "version_file" and its previous version in the delta control file "delta_control_file". The call returns the path and filename of the delta control file and the version identifier produced by the delta program. |
| –g | delta_control_file, restored_file_version, version_identifier | this call restores a version with the version identifier "version_identifier" from the delta control file "delta_control_file" and gives it the filename "restored_version_file". |
| –x | delta_control_file | this call erases the delta control file "delta_control_file". |
| –z | delta_control_file, version_identifier | this call erases subsequent delta versions of a version identifier "version_identifier" from the delta control file "delta_control_file". |
| –f | version_file | this call tests the contents of the input file "version_file" to determine if the contents are valid for the delta_ versioning mechanism of the delta program. The call returns a 0 if the contents are valid, a 1 if they are not valid. |

Each of the program calls also returns an exit code which indicates whether the call has succeeded or failed.

APPENDIX 2

```
#!/bin/ksh
for x
do
    case $x in
    -c)
      ROOT_FILE_NAME = $2
      SUFFIX = `echo $0 | awk -F/ '{print $NF}'`
      LAST_FNAME_COMP = `echo $ROOT_FILE_NAME | awk -F/ '{print $NF}'`
      S_FILE_NAME = `echo $ROOT_FILE_NAME | \
      sed 's/'$LAST_FNAME_COMP'/s.'$LAST_FNAME_COMP'.'$SUFFIX'/'`
      VERSION = 1.1
      if [! -f "$S_FILE_NAME" ]
      then
         $0 -d $S_FILE_NAME $ROOT_FILE_NAME
         rc = $?
           exit $rc
      fi
```

APPENDIX 2-continued

```
            admin -i$ROOT_FILE_NAME -r$VERSION $S_FILE_NAME >>/dev/null 2>&1
            rc = $?
         if [ rc -ne 0 ]
         then
              exit $rc
         fi
         echo $S_FILE_NAME
            echo $VERSION
            exit 0
            ;;
-g)
      S_FILE_NAME =$2
      TARGET_FILE_NAME = $3
      VERSION = $4
      LAST_T_FNAME_COMP = `echo $TARGET_FILE_NAME | awk -F/ '{print $NF}'`
      LAST_S_FNAME_COMP = `echo $S_FILE_NAME | awk -F/ '{print $NF} `
      TARGET_DIR = `echo$TARGET_FILE_NAME|sed's/'$LAST_T_FNAME_COMP'/./'`
      DELTA_FILE_NAME = `echo $LAST_S_FNAME_COMP | sed's/s.//'`
      CURRENT_DIR = `pwd`
      cd $TARGET_DIR
      EXIST_FLAG = 1
      while [ EXIST_FLAG -ne 0 ]
      do
         if [ -f $DELTA_FILE_NAME
         then
            sleep 1
         else
            EXIST_FLAG = 0
            get -s -r$VERSION $S_FILE_NAME >>/dev/null 2>&1
            rc =$?
            if [ rc -ne 0 ]
            then
               cd $CURRENT_DIR
               exit $rc
            fi
            mv -f $DELTA_FILE_NAME $LAST_T_FNAME_COMP
            cd $CURRENT_DIR
         fi
      done
      exit 0
      ;;
-d)
   S_FILE_NAME = $2
   TARGET_FILE_NAME = $3
   LAST_T_FNAME_COMP = `echo $TARGET_FILE_NAME | awk -f/ '{print $NF}'`
   LAST_S_FNAME_COMP = `echo SS_FILE_NAME | awk -F/ '{print $NF}'`
   TARGET_DIR = `echo $TARGET_FILE_NAME | sed 's/'$LAST_T_FNAME_COMP'/./'`
   DELTA_FILE_NAME = `echo $LAST_S_FNAME_COMP | sed 's/s.//'`
   P_FILE_NAME = `echo SS_FILE_NAME |
          sed 's/'$LAST_S_FNAME_COMP'/p.'$DELTA_FILE_NAME'/'`
   CURRENT_DIR = `pwd`
   cd $TARGET_DIR
   get -s -e SS_FILE_NAME >>/dev/null 2>&1
   rc = $?
   if [ rc -ne 0 ]
   then
         cd $CURRENT_DIR
         exit $rc
   fi
   rm -f $DELTA_FILE_NAME
   cp -f $LAST_T_FNAME_COMP $DELTA_FILE_NAME
   VERSION = `cat $P_FILE_NAME | awk '{print $2}'`
   delta -s -y SS_FILE_NAME >>/dev/null 2>&1
   rc = $?
   cd $CURRENT_DIR
   if [ rc -ne 0 ]
   then
       exit $rc
   fi
   echo SS_FILE_NAME
   echo $VERSION
   exit 0
       ;;
-x)
      S_FILE_NAME = $2
      rm -f $S_FILE_NAME
      rc = $?
      fi
      exit 0
```

APPENDIX 2-continued

```
        ;;
    -z)
        S_FILE_NAME = $2
        VERSION_TO_KEEP = $3
        prs -r$VERSION_TO_KEEP = -1 -d":I:" $S_FILE_NAME |\
        while read NEW_VERSION
            do
                if [ "$NEW_VERSION" != "$VERSION_TO_KEEP" ]
                then
                    rmdel -r$NEW_VERSION $S_FILE_NAME >>/dev/null 2>&1
                    rc = $?
                    if [ rc -ne 0 ]
                    then
                        exit $rc
                    fi
                fi
            done
    exit 0
    ;;
        -f)
            FILE_NAME = $2
            FILE_INFO = `file $FILE_NAME`
            TEST_TYPE = `echo $FILE_INFO | awk '/text/'`
            TEST_EMPTY = `echo $FILE_INFO | awk '/empty/'`
            TEST_ILLEGAL = `echo $FILE_INFO | awk '/illegal/'`
            TEST_DATA = `echo $FILE_INFO | awk '/data/'`
            if [ ! -z "$TEST_ILLEGAL" ] || [ ! -z "$TEST_DATA" ]
            then
                exit 1
            fi
            if [ -z "$TEST_TYPE" ] && [ -z "$TEST_EMPTY" ]
            then
                exit 1
            fi
            exit 0
            ;;
        *)
            exit 1
            ;;
    esac
done
```

The embodiments of the invention in which an exclusive property or privilege is claimed are defined as follows:

1. A method of providing delta-versioning for data associated with one or more specified objects stored in a data repository, the data being stored on a host file system, comprising the steps of:

(i) defining a delta-versioning program to be used with the data associated with each of said one or more specified objects;

(ii) creating a delta control file and associating the delta control file with each of said one or more specified objects, the data associated with each of said one or more specified objects being incorporated into said delta control file and otherwise removed from the host file system;

(iii) associating a unique identifier with each of said one or more specified objects, said identifier indicating the contents of said delta control file required to reconstruct the data associated with the specified object associated with said identifier.

2. The method of claim 1 further comprising the step of:

(iv) executing the defined delta-versioning program to restore data associated with a selected one of said one or more specified objects from the delta control file associated with said one object to a file on the host file system, said data being identified by said unique identifier associated with said selected object.

3. The method of claim 2 further comprising, prior to step (i), the step of determining which of two or more different delta-versioning programs can be defined for use with said data associated with said one or more specified objects.

4. The method of claim 2 wherein step (iv) is omitted if the data associated with said selected one of said one or more specified objects is already in a file on said host file system.

5. The method of claim 2 further comprising the step of:

(v) determining when the file of restored data created in step (iv) is no longer in use and deleting it from the host file system.

6. The method of claim 5 wherein step (iv) is omitted if the data associated with said selected one of said one or more specified objects is already in a file on said host file system.

7. The method of claim 2 including two or more objects, each of said two or more objects constituting a different version of each of the others of said two or more objects and further comprising the step of, starting from a selected one of said two or more objects, determining a version graph of said two or more objects, said specified objects comprising said selected one of said objects and each object in said version graph which proceeds said selected one of said objects.

8. The method of claim 7 wherein said specified objects further comprise each object in said version graph which succeeds said selected one of said objects.

9. A system for providing delta-versioning of data stored on a host file system, said data being associated with objects stored in a data repository, said stored objects including an original object and one or more related objects which are succeeding versions of said original object, comprising:

means to create a delta version control file containing an original version delta for data associated with said original object;

means to create a subsequent delta in said delta control file between data associated with a selected one of said one or more related objects and data associated with one of said original object and the others of said one or more related objects which precede said selected one object;

means to remove said data associated with said objects whose delta is in said delta control file from said host file system; and means to restore said data associated with a specified object to said host file system from said delta control file.

10. A system as defined in claim 9, wherein each said object includes means to indicate its relationship to related preceding and succeeding objects.

11. A system as defined in claim 10 wherein said means to create a subsequent delta is responsive to said means to indicate relationships such that said means to create subsequent deltas will first create a delta for each object for which a delta is not present in said delta control file and which precedes said selected one object.

12. A system as defined in claim 11 wherein said means to create subsequent deltas also creates a delta for object succeeding said selected one object.

13. A system as defined in claim 9 further including means to determine if said restored associated data is in use and wherein said means to remove data is responsive to said means to determine to remove restored data which is not in use.

14. A system as defined in claim 9 further including means to determine if said restored associated data is already present on said host file system and wherein said means to restore associated data is responsive to said means to determine to restore removed associated data only if said removed data is not present on said host file system.

15. A system as defined in claim 9 further including means to determine if said restored associated data is in use and wherein said means to remove data is responsive to said means to determine to remove restored data which is not in use.

16. A method of providing delta-versioning for the contents of file objects in a PCTE data repository wherein the contents of each file object are stored as files on a host file system, comprising the steps of:

(i) defining a delta-versioning program to be used with the contents of one or more specified file objects;

(ii) creating a delta control file and associating the delta control file with each of said one or more specified file objects, the contents files of each of said one or more specified file objects being incorporated into said delta control file and the contents files being removed from the host file system;

(iii) associating a unique identifier with each of said one or more specified file objects, said identifier indicating the contents of said delta control file required to reconstruct the contents of the file object associated with each file object.

17. The method of claim 16 further comprising the step of:

(iv) executing the defined delta-versioning program to restore the contents of a selected one of said file objects to said host file system from the delta control file associated, said contents being identified by said unique identifier associated with said selected file object.

18. The method of claim 17 further comprising the step of, prior to step (i), testing the contents of said specified file objects to determine one or more delta-versioning programs suitable for definition in step (i).

19. The method of claim 17 wherein step (iv) is omitted if the restored contents of said selected file object are already present on said host file system.

20. The method of claim 18 further comprising the step of:

(v) determining when the restored contents file created in step (iv) is no longer in use and deleting it from the host file system.

21. The method of claim 20 wherein step (iv) is omitted if the restored contents of said selected file object are already present on said host file system.

22. The method of claim 17 including two or more file objects, each of said two or more file objects constituting a different version of each of the others of said two or more file objects and further comprising the step of, starting from a selected one of said two or more file objects, determining the version graph of said two or more file objects, said specified file objects comprising said selected one file object and each file object in said version graph which proceeds said selected one file object.

23. The method of claim 22 wherein said specified file objects further comprise each file object in said version graph which succeeds said selected one file object.

* * * * *